United States Patent
Bjorklund et al.

(10) Patent No.: US 6,280,884 B1
(45) Date of Patent: Aug. 28, 2001

(54) PROCESS FOR PHOTOREFRACTIVE INDEX GRATING FORMATION

(75) Inventors: Gary Carl Bjorklund, Los Altos; William Esco Moerner, San Jose, both of CA (US); Scott Meixner Silence, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/230,659

(22) Filed: Apr. 21, 1994

(51) Int. Cl.$^7$ .................................................. G03H 1/02
(52) U.S. Cl. .................. 430/1; 430/2; 430/394; 359/3; 385/5; 385/130; 385/141
(58) Field of Search .................. 385/5, 130, 131, 385/141; 359/1, 3; 430/1, 2, 394

(56) References Cited

U.S. PATENT DOCUMENTS

| | | | |
|---|---|---|---|
| 3,993,485 | 11/1976 | Chandross et al. | 96/27 H |
| 4,971,426 | 11/1990 | Schildkraut et al. | 350/385 |
| 4,997,595 | * 3/1991 | Kurihira et al. | 252/587 |
| 4,999,809 | * 3/1991 | Schildkrant et al. | 430/20 |
| 5,028,109 | 7/1991 | Lawandy | 350/96.12 |
| 5,064,264 | * 11/1991 | Ducharme et al. | 385/130 |
| 5,142,605 | * 8/1992 | Dievier et al. | 385/141 |
| 5,178,980 | 1/1993 | Mort et al. | 430/58 |
| 5,215,841 | 6/1993 | Scharfe et al. | 430/59 |
| 5,223,356 | * 6/1993 | Kumar et al. | 430/1 |
| 5,292,620 | * 3/1994 | Booth et al. | 430/1 |
| 5,361,148 | * 11/1994 | Bjorklund et al. | 359/3 |

FOREIGN PATENT DOCUMENTS

| | | | |
|---|---|---|---|
| 0514786 | * 11/1992 | (EP) | 359/3 |
| 2245782 | 10/1990 | (JP) . | |
| 5070298 | 3/1993 | (JP) . | |

OTHER PUBLICATIONS

Walsh et al. "Two beam Coupling . . . " JJaSA B Sep. 1992 1642–1647.*
Zhang et al. "Observation of Photorefractivity in . . . " Oct. 1992 Phys. Rev. B. pp 9900–9902.*
Moener et al. "Photorefractivity in doped NCO Polymers" SPIE (1991) 278–289.*
Silence et al. "Cgo sensitization of Photorefractive Polymer" Appl. Phys. Lett. Dec. 1992 2967–2969.*

* cited by examiner

*Primary Examiner*—Martin Angebranndt
(74) *Attorney, Agent, or Firm*—Robert B. Martin

(57) ABSTRACT

The present invention relates to an improved process for photorefractive index grating formation utilizing polymeric photorefractive materials. The process involves the steps of: (i) exposing a polymeric optical article to electromagnetic radiation having an intensity of at least 0.05 W/cm$^2$ for a short period of time to achieve an absorbed energy/unit volume of at least $1\times10^3$ J/cm$^3$ to activate the article, and (ii) exposing the polymeric optical article to an electric field and electromagnetic radiation to form an index grating.

8 Claims, No Drawings

PROCESS FOR PHOTOREFRACTIVE INDEX GRATING FORMATION

FIELD OF THE INVENTION

The present invention relates to an improved process for photorefractive index grating formation.

BACKGROUND OF THE INVENTION

The photorefractive effect involves light-induced charge redistribution in a nonlinear optical material to produce internal electric fields which by virtue of the optical nonlinearity, produce local changes in the index of refraction such that dynamic, erasable holograms are formed which diffract light. The photorefractive effect is achieved by exposing the material to an optical intensity pattern consisting of bright and dark regions, such as formed by interfering two coherent laser writing beams of the same polarization. Mobile charge generated in the material migrates under the influence of diffusion and drift processes to form internal space charge electric fields which create refractive index variations due to the electrooptic effect. These variations in refractive index in the photorefractive material are known as index gratings. The index gratings diffract light and are useful for a variety of applications, including storage of holographic images, diffractive optical elements, and photorefractive two-beam coupling.

Inorganic crystals exhibiting the photorefractive effect are well known in the art as described in Gunter and Huignard, "Photorefractive Materials and Their Applications", Vols. I and II ("Topics in Applied Physics", Vols. 61 and 62) (Springer, Berlin, Heidelberg, 1988). Inorganic photorefractive crystals have been fabricated into optical articles for the transmission and control (change in phase, intensity, or direction of propagation) of electromagnetic radiation, as well as for holographic image and data storage.

However, it is technically difficult to fabricate such crystals into desired large area samples or thin-layered devices such as optical wave guides or multiple-layer stacks. Further, it is difficult to dope crystalline material with large concentrations of dopants in order to achieve desired property improvements, such as increase in the speed and/or magnitude of the photorefractive effect, because dopants are often excluded from the crystals during growth.

Certain polymeric photorefractive materials have been described by Ducharme et al., U.S. Pat. No. 5,064,264, and Schildkraut et al., U.S. Pat. No. 4,999,809. These polymeric materials can be fabricated into thin-layered devices such as optical waveguides and multilayer stacks. Further, they can be readily doped with materials to improve a photorefractive effect.

Schildkraut describes a photorefractive device having a layer of material comprising a sensitizer, a charge transporting layer, a binder, and an organic molecular dipole, which has been poled in an electric field at elevated temperatures so that the alignment of the molecular dipoles remains for long times at ambient temperatures. Although the material is shown to have light-induced changes in measured properties, Schildkraut does not show the formation of a photorefractive grating to demonstrate a photorefractive device.

Ducharme et al. describe photorefractive materials comprising a polymer, a nonlinear optical chromophore, a charge transport agent, and optionally a charge generator. Although these materials are useful in certain applications, there still is a desire in the industry for a photorefractive process having longer characteristic decay time of diffraction efficiency.

It is therefore an object of the present invention to provide an improved process for photorefractive index grating formation. Other objects and advantages will be apparent from the following disclosure.

SUMMARY OF THE INVENTION

The present invention relates to a process for forming photorefractive index grating in a polymeric optical article comprising the steps of: (i) exposing the polymeric optical article to electromagnetic radiation having an intensity of at least 0.05 watts/cm$^2$ for a short period of time to achieve an absorbed energy/unit volume of at least $1 \times 10^3$ Joules/cm$^3$ to activate the article, and (ii) exposing the polymeric optical article to an electric field and electromagnetic radiation to form an index grating. The first exposure step of the process of the present invention surprisingly increases the diffraction efficiency of the article and also decreases the decay rate of the diffraction efficiency of the optical article. The polymeric optical article generally comprises a polymer, a charge transporting agent, a sensitizer, and a nonlinear optical chromophore (NLO chromophore). The charge transporting agent and/or the NLO chromophore may be covalently attached to the polymer or alternatively are dispersed in the polymer as guest/host.

The present invention also relates to holographic storage of information using the process of the present invention.

A more thorough disclosure of the present invention is presented in the detailed description which follows.

DETAILED DESCRIPTION OF THE INVENTION

The present invention relates to a process for producing a photorefractive index grating in a polymeric optical article comprising the steps of: (i) exposing a polymeric optical article to electromagnetic radiation having an intensity of at least 0.05 W/cm$^2$ for a short period of time to achieve an absorbed energy/unit volume of at least $1 \times 10^3$ J/cm$^3$ to activate the article, and (ii) exposing the polymeric optical article to an electric field and electromagnetic radiation to form an index grating.

In a first embodiment of the process of the present invention, the process for producing a photorefractive index grating in a polymeric optical article comprises the steps of: (i) flood exposing a polymeric optical article to a beam of electromagnetic radiation having an intensity of at least 0.05 W/cm$^2$ for a short period of time to achieve an absorbed energy/unit volume of at least $1 \times 10^3$ J/cm$^3$ to activate the article, and (ii) exposing the polymeric optical article to an external electric field and to two intersecting beams of coherent electromagnetic radiation of the same polarization. The activation of the article in step (i) of the process is enhanced by additionally exposing the article to an electric field during step (i).

In a second embodiment of the process of the present invention, the process for producing a photorefractive index grating in a polymeric optical article comprises the steps of: (i) patterned exposure of a polymeric optical article to electromagnetic radiation having an intensity of at least 0.05 W/cm$^2$ for a short period of time to achieve an absorbed energy/unit volume of at least $1 \times 10^3$ J/cm$^3$ to activate the article, and (ii) exposing the polymeric optical article to an electric field and electromagnetic radiation to form the index grating. The patterned exposure of step (i) can be achieved by two intersecting beams of coherent electromagnetic radiation of the same polarization to achieve spatially varying intensity. Alternatively, the article can be spatially patterned with one beam of electromagnetic radiation with, for example, a transverse intensity distribution that is modulated binary or gray scale. In step (ii) of the second embodiment, the article can be flood exposed to electromagnetic radiation to form the index grating or, alternatively, can be exposed to two intersecting beams of coherent electromagnetic radiation of the same polarization to form the index grating such as a reference and signal beam.

As used herein, index grating shall mean a sinusoidal spatial modulation of the optical index of refraction of the article. The spatial modulation has a spatial wavelength and a spatial frequency, which is defined as the number of peaks (or valleys) per unit length. A perfect index grating with a single spatial frequency component is produced by using two intersecting beams, each of which is a perfect plane wave, optionally with a Gaussian transverse intensity distribution. In that case, the spatial frequency of the index grating produced by the process of this invention is equal to $2n \sin \theta/\lambda$, where $\lambda$ is the laser wavelength in air, n is the index of refraction of the polymeric optical article, and $\theta$ is the full angle of intersection of the two beams inside the sample.

More complicated photorefractive diffractive index gratings are described by a Fourier superposition of a multiplicity of index gratings, each with a distinct amplitude, spatial frequency, and spatial phase (see for example, Introduction to Fourier Optics, by J. W. Goodman, McGraw-Hill, 1968), which is incorporated herein by reference. Such index gratings can be readily produced by the process of this invention by first activating the article and then using either multiple exposures to different sets of intersecting plane wavebeams or using a single exposure to intersecting beams, at least one of which is not a plane wave. A preferred means of holographic recording of images or data using the process of this invention is to first activate the article and then to expose the polymeric optical article to intersecting beams, one of which is essentially a plane wave reference beam and the other of which is a complicated information-bearing signal beam. A preferred means of producing a diffractive optical element using the process of this invention is to first activate the article and then to expose the polymeric optical article to two intersecting beams that have smoothly varying wavefronts with finite radius of curvature.

The polymeric photorefractive optical article for use in the process of the present invention preferably comprises a polymer, a nonlinear optical chromophore, and optionally a sensitizer and a charge transport agent. The first component of the optical article is the polymer which functions as a matrix. The polymer may be a homopolymer, copolymer, or polymer blend. The polymer component will generally have a molecular weight $M_n$ of about 1,000 to 10,000,000. The polymer preferably is substantially amorphous to avoid scattering of incident light beams. The NLO chromophore or charge transporting agent may be dispersed in the polymer as guest/host or alternatively covalently bonded to the polymer. For guest/host compositions, suitable binder polymers include poly(acrylates), poly(methacrylates), poly(acetates), poly(imides), poly(carbonates), poly(styrenes), and other transparent amorphous polymers as known in the art. The article will generally comprise about 70 weight % of the polymer, preferably about 50 weight %.

A second component of the optical article is the charge transporting agent. The charge transporting agent can be dispersed in the polymer or alternatively covalently bonded to the polymer to form a charge transporting matrix. Suitable charge transporting agents are disclosed in Ducharme et al., U.S. Pat. No. 5,064,264, the disclosure of which is incorporated herein by reference. Preferred charge transporting agents are hydrazones, carbazoles, amino-substituted aryl methanes, aryl amines, pyrazolines, oxazoles, oxadiazoles, and amino-substituted stilbenes for transport of holes; and nitro-substituted fluorenones for the transport of electrons. Other suitable charge transport agents for use in the present invention will be known to those skilled in the art, such as those disclosed by Mort and Pfister, "Electronic Properties of Polymers", Wiley, 1982, the disclosure of which is incorporated herein by reference. The article generally comprises at least 20% by weight of the charge transporting agent, preferably at least 30% by weight. The charge transporting matrix functions to transport migrating charge to create space charge fields within the article, thereby creating localized refractive index variations due to the electrooptic effect. Suitable charge transporting polymers for use as the charge transporting matrix in the process of the present invention include poly(vinyl carbazole), poly(silane)s, poly(para-phenylene vinylene), poly(aniline), and other charge transporting polymers as known in the art.

The optical article also optionally comprises a sensitizer. The formation of the spatially varying internal electric field requires the generation of a mobile charge as a result of the action of the two interfering coherent light beams of the same polarization. The generation of a mobile charge may be accomplished in some cases by light absorption in the NLO chromophore and subsequent separation of an electron-hole pair, i.e., the NLO chromophore can function to generate the mobile charge which migrates during the photorefractive effect. However, the NLO chromophore will generally have a low absorption at the operating wavelengths. Therefore, the optical article is preferably doped with a sensitizer to generate charge upon exposure to electromagnetic radiation at the operating wavelengths. The sensitizer in some cases can form a complex with the charge transporting polymer or the NLO chromophore. Suitable sensitizers for use in the process of the present invention include tri-nitrofluorenone (TNF), fullerenes such as $C_{60}$ and $C_{70}$, perylene dyes such as perylene dicarboxyimide, squaryllium dyes, charge transfer complexes such as anthracene/tetracyanoquinodimethane, and molecules with oxidation potential greater than the charge transporting agent for hole transport and less than the charge transporting agent for electron transport, and with optical absorption preferably in the wavelength region greater than 500 nm. Other sensitizing agents will be known in the art such as those disclosed in U.S. Pat. No. 5,064,264, the disclosure of which is incorporated herein by reference. The sensitizer or a charge transfer complex formed by the sensitizer and either the charge transporting polymer or the NLO chromophore absorbs the incident light and generates the mobile charge. Preferably, the quantum yield of mobile charge generation, which is the number of mobile charges generated per sensitizer molecule per photon absorbed, is greater than 1 percent, more preferably greater than 10 percent, and most preferably greater than 90 percent. Generally, the article comprises about 0.01 weight % to about 10 weight % of the sensitizer, preferably less than 1.5 weight %.

A third component of the optical article for use in the process of the present invention is a nonlinear optical chromophore (NLO chromophore). The organic molecule serving as the NLO chromophore has unsymmetrical, polarized, conjugated π or σ electrons between an electron donor group and an electron acceptor group. The NLO chromophore has a permanent electric dipole moment in the ground electronic state. The NLO chromophores are generally homogeneously dispersed in the polymer binder as a guest/host or alternatively covalently bonded to the polymer. The high nonlinear optical coefficient will function to provide a large change in the optical index of refraction when a nonzero local field is present. Some NLO chromophores, such as the benzimidazolines, also function as charge transporting agents obviating the need for a separate charge transport agent.

NLO chromophores can be substituted with solubilizing groups such as alkyl, alkoxy, or perfluoroalkyl, which are not significantly detrimental to the nonlinearity and which may impart other useful properties such as solubility and miscibility with the host polymer. Preferred NLO chromophores for use in the process of the present invention are:

1. benzimidazolines such as:

1,3-dimethyl-2,2-tetramethylene-5-nitrobenzimidazoline (DTNBI),
1,3-dimethyl-2,2-dimethyl-5-nitrobenzimidazoline (DDNBI)
1,3-dimethyl-2,2-(2 methyl-tetramethylene)-5-nitro benzimidazoline (MDTNBI)
1,3-dimethyl-2,2-pentamethylene-5-nitrobenzimidazoline (DHNBI)

2. (+)-2-($\alpha$-methylbenzyl)amino-5-nitropyridine (MBANP)
3. 4-piperidinobenzylidenemalononitrile (PDCS)
4. 2-trifluoromethyl-4-nitro-4'-methoxystilbene (MTFNS)
5. Tolanes
6. a substituted styrene having the general structure

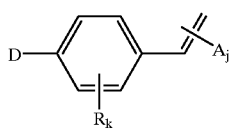

wherein D is an electron donating group such as alkoxy, aryloxy, thioalkyl, thioaryl, amino, alkylamino, or arylamino which is located preferably in the para position; wherein $A_j$ is one or more of the electron withdrawing groups such as nitro, cyano, sulfonyl, carbonyl, or alkoxycarbonyl and which number j=1, 2, or 3 and are attached to the styrene at the $\beta_{trans}$, $\beta_{cis}$, or $\alpha$ positions and also the electron withdrawing groups such as nitrovinyl, dicyanovinyl, tricyanovinyl, and nitrophenyl when attached to the $\beta_{trans}$ position; and wherein $R_k$ is an additional substituent on the aromatic ring including halogen, alkyl, perfluoroalkyl, and alkoxy which are introduced so as to further influence the transparency, nonlinearity, and solubility of the chromophore as a function of their exact identity, number, and location. A preferred substituted styrene is 4,N,N'-di(p-tolyl) amino-B,B-dicyanostyrene (DTADCST).

The internal space charge field formed in the charge transporting matrix depends upon trapped electrons or holes for its source. In many polymeric materials, the trapping sites are accidental, due to defects and impurities in the amorphous polymer matrix. Space charge trapping can be enhanced, if desired, by the deliberate incorporation of trapping species into the optical article. When the charge transport agent is an electron donor, transporting holes, trap sites can be provided by the incorporation of a second donor of lower oxidation potential as disclosed, for example, in Ducharme et al. When the charge transport agent is an electron acceptor, transporting electrons, trap sites can be provided by the incorporation of a second acceptor of greater electron affinity.

In the first step of the process of the present invention, the polymeric optical article is exposed to electromagnetic radiation to activate the article. The article is exposed to electromagnetic radiation, preferably at a wavelength of about 500 nm to 2000 nm. Suitable radiation sources include mercury or xenon lamps, krypton or argon lasers, diode lasers, dye lasers, or titanium sapphire lasers. The preferred radiation source is krypton, argon, or a diode laser. Generally, the article is exposed to electromagnetic radiation having an intensity of at least about 0.05 W/cm$^2$, preferably at least about 0.1 W/cm$^2$, more preferably at least about 1 W/cm$^2$, and most preferably at least about 10 W/cm$^2$. Preferably, in step 1 of the process of the present invention, the article has an absorption coefficient at the wavelength of the incident beam of about 0.1 cm$^{-1}$ to about 100 cm$^{-1}$, preferably about 1 cm$^{-1}$ to about 30 cm$^{-1}$. The article is exposed to electromagnetic radiation for a period of time of about 15 minutes, preferably about 30 minutes, and more preferably about 60 minutes. During the first step, the article is exposed to an incident fluence of at least about 1×10$^3$ J/cm$^2$, preferably at least about 1×10$^4$ J/cm$^2$, and more preferably at least about 1×10$^5$ J/cm$^2$. It is desirable to adjust the intensity and length of the exposure to achieve the maximum amount of activation of diffraction efficiency without causing photochemical degradation of the sample which can lower the diffraction efficiency through light scattering. The absorbed energy/unit volume (absorption coefficient times incident fluence) is at least about 1×10$^3$ J/cm$^3$, preferably at least about 1×10$^4$ J/cm$^3$, more preferably at least about 1×10$^5$ J/cm$^3$, and most preferably at least about 1×10$^6$ J/cm$^3$. The exposure of the polymeric article to electromagnetic radiation prior to forming the index grating in the article surprisingly results in substantially increasing the diffraction efficiency of the optical article and also decreasing the decay rate of the diffraction efficiency of the optical article.

In the first step of the process of the present invention, the entire article may be flood exposed to electromagnetic radiation or, alternatively, the article can be pattern exposed to electromagnetic radiation. Such patterning can be utilized to form a spatially-modulated enhancement of the diffraction efficiency for the purpose of: (i) compensating for a non-uniform intensity distribution in one or both writing laser beams, (ii) filtering a specific spatial frequency in the index grating, (iii) performing optical correlation, and (iv) fabricating a latent hologram or diffractive optical element.

In the first step of the process of the present invention, the article is optionally biased in an electric field. The method of establishing an electric field is well known in the art, for example, by locating the optical article between two transparent plates, each coated with a transparent conducting material such as indium tin oxide. Suitable field values for the external field are about 0 V/$\mu$m to 500 V/$\mu$m, preferably about 50 V/$\mu$m. The optical article is electrically biased during the second step of the process with external field of about 0.1 V/$\mu$m to 500 V/$\mu$m, preferably about 50 V/$\mu$m.

Preferred sources of electromagnetic radiation are coherent light beams for use in steps 1 and 2 of the process of the present invention, such as lasers and other light sources of high temporal and spatial coherence. Preferred lasers are krypton ion, argon ion, titanium sapphire, dye, diode, and neodymium yttrium aluminum garnet lasers. Preferably, the light has a wavelength between 500 and 2000 nm. For two incident beams, they are focused so that they intersect within the optical article; that is, both beams overlap over a distance short compared to the coherence length and the illuminated volume of the optical article is substantially composed of the overlap region. Preferably, in the second step of the process, the article has a low absorption coefficient for the incident beam(s). As a result of the coherence requirement, the overlap region contains an optical interference pattern; that is, a pattern of bright and dark light fringes. In the case that the two beams have a uniform optical intensity, the fringe pattern has a sinusoidal dependence on distance, with a well-defined spatial wavelength and spatial frequency, defined as the number of peaks or valleys per unit length. Preferably, this light pattern is stationary as is the case when both beams have the same wavelength. In the case that the beams have slightly different wavelengths, the bright and dark fringe pattern must move slowly enough so that charge redistribution can still occur and follow the moving fringe pattern.

The photorefractive optical article can be freestanding or alternatively can be disposed in a waveguide, fiber, or multilayer stack. The methods for making such optical articles, establishing the external electric field, and overlapping the coherent laser beams in the article are disclosed in Gunter and Huignard (reference above); waveguide—Herminghaus et al., JOSA B, 8, 2311 (1991); fiber—Hesselink et al., Opt. Lett., 13, 877 (1988); and photopolymer stack—Nordin et al., Opt. Lett., 17, 1709 (1992), which are incorporated herein by reference. Surprisingly, the process of the present invention increases the diffraction efficiency (power of diffracted beam divided by the power of the reading beam) of the article. Surprisingly, the process of the present invention also decreases the decay rate of the diffraction efficiency of the photorefractive polymeric optical article. The decrease in decay rate is an important property for the use of the article for storage of information.

The process of the present invention can be utilized in a variety of applications such as optical phase conjugation, optical beam deflection, holographic optical data and image storage, optical interconnection, coherent optical amplification, optical limiting, optical processing, optical correlation, optical pattern recognition, beam fanning, and self-phase conjugation.

The present invention also relates to a process for holographic storage (see R. J. Collier et al., Optical Holography, Ch. 16, Academic Press (1991)). The process for holographic storage of the present invention generally involves (i) exposing the photorefractive polymeric optical article to electromagnetic radiation having an intensity of at least 0.05 W/cm$^2$ for a short period of time to achieve an absorbed energy/unit volume of at least $10^3$ J/cm$^3$ to activate the article, and (ii) exposing the photorefractive optical article to an external electric field and electromagnetic radiation to form an index grating. Preferably, the index grating is formed in step (ii) with two intersecting coherent writing beams of the same polarization. One of the two writing beams is a noninformation-bearing reference beam, preferably a collimated or weakly focused beam with nearly planar phase fronts. The second beam is the information-bearing signal beam, which in general has a complicated phase front and has a complicated transverse intensity distribution. Information in the form of parallel blocks of data is impressed on the signal beam by passing it through a mask or page composer that modulates its transverse phase or intensity profile. The photorefractive optical article records the hologram as a complicated three-dimensional spatial pattern of index of refraction variation, which is mathematically equivalent to the Fourier superposition of a multiplicity of sinusoidal index gratings, each with a distinct amplitude and spatial frequency and phase. After an appropriate strength of the overall index of refraction variation is reached, the reference and signal beams are shut off. In an alternative embodiment, the article is pattern exposed during step (i) with intersecting reference and signal beams of coherent electromagnetic radiation, and flood exposed in step (ii) to form the index grating.

The information recorded in the hologram can be read out by illuminating the photorefractive optical article with a duplicate of the original reference beam. The index of refraction variations produced by the writing process diffract light from the readout beam to form a reconstruction of the original information-bearing signal beam, which originates within the photorefractive optical article and propagates through free space beyond the article. The holographically recorded data is then recovered by using standard optical elements to capture the reconstructed beam and form a real image of the plane of the page composer on a high-resolution detector array.

When the photorefractive article is thick compared to the inverse of the dominant spatial frequency component of the recorded hologram, multiple holograms can be multiplexed in the same spot on the photorefractive article by varying the angle of incidence of the reference beam so that each hologram is produced by a separate angle of intersection of reference and signal beams during the writing process. Selected holograms are then read out by illuminating the same spot on the photorefractive article with readout beams that duplicate the particular reference beam used in the recording process, including the same angle of incidence. (As described by D. L. Staebler et al., Appl. Phys. Lett., 26, 182 (1975)) Alternatively, multiplexing can be achieved by encoding the phase fronts of each reference beam (as described by C. Denz et al., Optics Communications, 85, 171–176 (1991)) or by varying the laser wavelength used to form the reference, signal, and readout beams.

A holographic storage device comprises:
 (1) an activated photorefractive polymeric optical article comprising a polymer, NLO chromophore, and optionally a charge transport agent;
 (2) means for intersecting two beams of coherent electromagnetic radiation of the same polarization (the reference and signal beams) in the article;
 (3) means for applying an external electric field; and
 (4) means for impressing spatial information on the signal beam.

The optical article has been activated by the process of the present invention. Preferably, the device is provided with means for controlling the reference beam's phase and/or angle. The operational parameters for holographic storage process and components for holographic storage devices are well known in the art for crystalline photorefractive material such as disclosed in the Collier et al. reference above, the disclosure of which is incorporated herein by reference. The present invention also relates to a diffractive optical element process and device which are similar to the storage process and device, except that (4) is replaced with means for impressing desired radii of curvature on one or both beams.

The following examples are detailed descriptions of the process of the present invention. The detailed preparations fall within the scope of, and serve to exemplify, the more generally described methods set forth above. The examples are presented for illustrative purposes only, and are not intended as a restriction on the scope of the invention.

EXAMPLE 1

Synthesis (a) 3-fluoro-4-N,N-diethylamino-β-nitrostyrene (FDEANST)

In a 500 mL round bottom flask equipped with stirbar and nitrogen inlet was placed 3-fluoro-4-diethylaminobenzaldehyde (9.76 g, 50 mmol), nitromethane (6.5 g, 100 mmol), methanol (50 mL), and ethylenediamine diacetic acid salt (0.90 g, 5.0 mmol). The resulting solution was stirred at room temperature for 36 hours and then chilled in an ice bath and the crystalline product isolated by suction filtration, washed well with cold methanol, and air dried. The red crystals were further purified by one more crystallization from methanol, (6.46 g, 54%): mp 73.3–74.0°; $^1$H NMR (CDCl$_3$) δ7.90 (d, J=14 Hz, 1H), 7.46 (d, J=14 Hz), 7.22–7.13 (m, 2H), 6.77 (t, J=9 Hz, 1H), 3.40 (q, J=7 Hz, 4H), 1.21 (t, J=7 Hz, 6H); $^{13}$C NMR (CDCl$_3$) ppm 152.186 (d, J=244 Hz), 141.360 (d, J=8 Hz), 138.739 (d, J=2 Hz), 133.452, 127.320, 118.848 (d, J=8 Hz), 116.735 (d, J=19 Hz), 116.513, 45.998 (d, J=5 Hz), 13.04. Anal. Calcd for $C_{12}H_{15}FN_2O_2$: C, 60.49; H, 6.34; N, 11.75; F, 7.97. Found: C, 60.58; H, 6.27; N, 11.97; F, 7.97. Additional product could be obtained by combination of the mother liquors and chromatography.

(b) 1,3-dimethyl-2,2-tetramethylene-5-nitrobenzimidazoline (DTNBI)

In a 250 mL round bottom flask was placed 3,4-bis(methylamino)nitrobenzene (0.905 g, 5.0 mmol), ethyl acetate (125 mL), cyclopentanone (2.10 g, 25.0 mmol), and toluenesulfonic acid hydrate (25 mg). The resulting solution was boiled on a steam bath for one hour and then silica gel (10 g) was added and the slurry concentrated to dryness. This mixture was placed at the top of a silica gel column and eluded with a gradient of ethyl acetate in hexane (0→18%). Fractions containing pure product were combined and concentrated and recrystallized from a mixture of isopropyl ether and dichloromethane to give black glistening needles (1.09 g, 87%): mp 104.8–107.7; $^1$H NMR (CDCl$_3$) δ7.66 (dd, J=2 Hz, 8 Hz, 1H), 6.80 (d, 2 Hz, 1H), 5.95 (d, 8 Hz, 1H), 2.88 (s, 3H), 2.81 (s, 3H), 1.90–2.05 (m, 4H), 1.66–1.89 (m, 4H); $^{13}$C NMR (CDCl$_3$) ppm 140.016, 139.997, 138.779, 118.792, 98.654, 97.471, 95.557, 34.132, 27.954, 27.811, 26.063.

EXAMPLE 2

(a) To 0.25 ml of the solvent toluene was added 38 mg of the inert binder polymer polymethylmethacrylate (PMMA), 19 mg of the chromophore DTNBI, and 0.1 mg of the sensitizer $C_{60}$. The solution was deposited on two glass plates coated with 120 nm of the transparent conducting material indium tin oxide (ITO). The polymer mixture was dried under ambient conditions for 16 hours and at 50° C. at a pressure of <0.1 atm. for an additional 6 hours. The coated plates were then heated at 140° C. for 2 minutes and the plates were pressed together to seal the polymer mixture between them. The plates were held parallel by means of 125 μm mylar spacers placed at the edges of the plates.

Photoconductivity was demonstrated by placing 500 V bias across the sample and measuring the increase in the current when the sample was irradiated with 100 mW of monochromatic 676 nm light with a spot size of 3 mm. From this, the photoconductivity per unit light intensity σ/I was determined to be $8\times10^{-14}$ $(\Omega cm)^{-1}/(W/cm^2)$.

The photorefractive properties are characterized by the holographic optical techniques of four-wave mixing (FWM) and two-beam coupling (2BC). In either technique, two continuous wave writing beams (λ=676 nm, 6 mW power, 750 μm spot diameter) from a krypton laser are overlapped in the sample using an external angle of 30 degrees. The sample is tilted 45 degrees from the bisector of the write beams in order to provide a projection of the grating wavevector along the direction of the applied electric field ($E_0$=40 V/μm unless otherwise noted). In the FWM experiments, the writing beams are s-polarized and the grating is read out with p-polarized reading beam (676 nm, 75 μm spot diameter) counterpropagating to one of the writing beams. The diffraction efficiency η is defined as the power of the diffracted beam exiting the sample, divided by the power of the reading beam incident on the sample. In the 2BC experiments, the intensities of the p-polarized writing beams exiting the sample are monitored directly. Photorefractivity results in asymmetric two-beam coupling where one beam increases in intensity and the other beam decreases in intensity.

The photorefractive effect of the sample was demonstrated by means of the degenerate FWM and 2BC techniques. The operating wavelength in both measurements was 676 nm. When a bias field of 5000 V is placed across the sample, a peak diffraction efficiency of $\eta=1.9\times10^{-3}$ was observed in the FWM measurement. At the same field, the 2BC was observed to be asymmetric with a gain coefficient of $\Gamma=7.7$ cm$^{-1}$.

(b) The same sample in which the photorefractive effect was demonstrated in (a) above was uniformly irradiated to absorb an energy/unit volume of $4\times10^5$ J/cm$^3$ (λ=647 nm, 50 mW power, 750 μm spot size, α=10 cm$^{-1}$, and 60 minutes irradiation time). The photorefractive effect was then demonstrated again in this sample by means of the degenerate FWM and 2BC techniques discussed above. The operating wavelength in both measurements was 676 nm. When a bias field of 5000 V is placed across the sample, a peak diffraction efficiency of $\eta=3.5\times10^{-3}$ was observed in the FWM measurement. At the same field, the 2BC was observed to be asymmetric with a gain coefficient of $\Gamma=10$ cm$^{-1}$.

(c) The same sample in which the photorefractive effect was demonstrated in (b) above was uniformly irradiated further to absorb an energy/unit volume of $>4\times10^6$ J/cm$^3$ (λ=647 nm). The photorefractive effect was then demonstrated again in this sample by means of the degenerate FWM and 2BC techniques discussed above. The operating wavelength in both measurements was 676 nm. When a bias field of 5000 V is placed across the sample, a peak diffraction efficiency of $\eta=2.3\times10^{-2}$ was observed in the FWM measurement. At the same field, the 2BC was observed to be asymmetric with a gain coefficient of $\Gamma=24$ cm$^{-1}$. The holographic storage lifetime of the sample, characterized by the time necessary for the diffraction efficiency to decay to 10% of the initial value, is measured to be 1.1 hours at a reading intensity of $1.5\times10^{-2}$ W/cm$^2$ and estimated to be >250 hours at a reading intensity of $2\times10^{-5}$ W/cm$^2$.

EXAMPLE 3

Following the procedures of Example 2, diffraction efficiencies and the decay of diffraction efficiencies were measured for the following samples: the decay of the diffraction efficiency η is well characterized by the square of a biexponential decay $$\eta(t)=[A\exp(-t/\tau_{d1})+B\exp(-t/\tau_{d2})]$$

where $\tau_{d1}$ is the faster characteristic decay time and $\tau_{d2}$ is the slower characteristic decay time.

For each sample, there is given the ratio of diffraction efficiency of the unexposed and preexposed sample (DE), and also the ratio of the fast decay time (D1) and ratio of slow decay time (D2) for the unexposed and preexposed sample. Samples a–h all comprised 33% of PMMA, whereas sample i comprised 33% of polyvinylcarbazole (PVK):

(a) 33% DDNBI|0.2% $C_{60}$
DE=1.54; DI=9.2; D2=6.1

(b) 33% DDNBI|0.2% $C_{60}$
DE=2.64; D1=1.4; D2=1.5

(c) 33% DTNBI|0.2% $C_{60}$
DE=1.73; D1=3.53; D2=3.06

(d) 33% DTNBI|0.5% $C_{60}$
DE=2.09; D1=1.92; D2=3.02

(e) 33% DTNBI|1.0% $C_{60}$
DE=8.70; D1=1.55; D2=2.9

(f) 33% DTNBI|1.0% trinitrofluoenone
DE=4.13; D1=22.6; D2=5.39

(g) 33% MDTNBI|0.2% $C_{60}$
DE=3.02; D1=3.18; D2=3.08

(h) 33% DTADCST|0.2% $C_{60}$
DE=1.27; D1=1.69; D2=1.27

(i) 33% FDEANST|0.2% $C_{60}$
DE=1.19; D1=5.3; D2=5.02

Samples of PMMA/FDEANST/$C_{60}$ and PVK/FDEANST/TNF showed photochemical damage with a reduction in diffraction efficiency.

EXAMPLE 4

Following the procedure of Example 2, the material of Example 1 containing 1.0% $C_{60}$ was pattern exposed by radiation with two intersecting beams of coherent radiation without an electric field to obtain an energy/unit volume of $4\times10^3$ J/cm$^3$ ($\lambda$=676 nm, $\alpha$=70 cm$^{-1}$, 6 mW power, 1 minute of irradiation time) to form a latent index grating. The sample was the flood irradiated with electromagnetic radiation (0.02 W/cm$^2$) with an external electric field for 1 hour to form index grating with a diffraction efficiency of $10^{-5}$.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A process for holographic storage in a photorefractive polymeric optical article comprising a polymer and a non linear optical chromophore comprising the steps of (i) exposing the article to electromagnetic radiation having an intensity of at least 0.05 W/cm$^2$ to obtain an absorbed energy/unit volume of at least $1\times10^4$ J/cm$^3$ from said radiation to activate the article without forming an index grating and (ii) exposing said article to an external electric field and electromagnetic radiation to cause formation of an index grating provided one of the step (i) or step (ii) exposures is with two intersecting beams of coherent electromagnetic radiation and the other step exposure is a flood exposure.

2. The process of claim 1 wherein in step (i) the article is flood exposed and in step (ii) the article is exposed with intersecting reference and signal beams of coherent electromagnetic radiation.

3. The process of claim 1 wherein in step (i) the article is patterned exposed with intersecting reference and signal beams of coherent electromagnetic radiation and in step (ii) the article is flood exposed.

4. The process of claim 1 wherein during step (i), the electromagnetic radiation has an intensity of at least 1 W/cm$^2$.

5. The process of claim 1 wherein the polymer is poly (methacrylate) poly(vinyl carbazole), poly(silane), poly (para-phenylene vinylene), or poly(aniline).

6. The process of claim 1 wherein the nonlinear chromophore is 3-fluoro-4-N,N-diethylamino-$\beta$-nitrostyrene;
1,3-dimethyl-2,2-tetramethylene-5-nitrobenzimidazoline;
1,3-dimethyl-2,2-pentamethylene-5-nitrobenzimidazoline; or
1,3-dimethyl-2,2-dimethyl-5-nitrobenzimidazoline.

7. The process of claim 1 wherein the article further comprises a charge transporting agent.

8. The process of claim 1 wherein the article further comprises a sensitizer.

\* \* \* \* \*